(No Model.)
C. C. JEROME.
ROD PACKING.
No. 409,791. Patented Aug. 27, 1889.
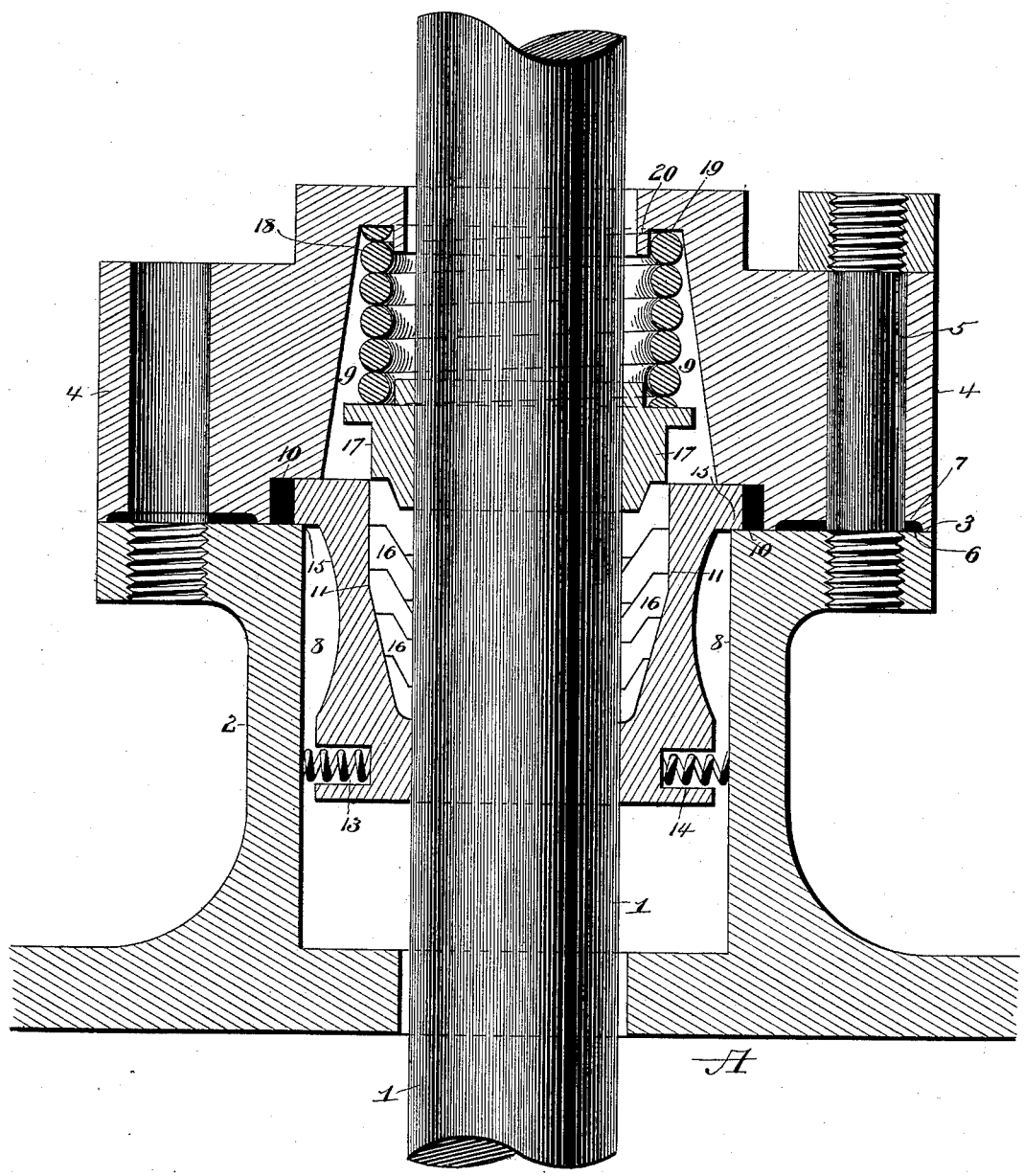

UNITED STATES PATENT OFFICE.

CHARLES C. JEROME, OF CHICAGO, ILLINOIS.

ROD-PACKING.

SPECIFICATION forming part of Letters Patent No. 409,791, dated August 27, 1889.

Application filed February 13, 1889. Serial No. 299,750. (No model.)

*To all whom it may concern:*

Be it known that I, CHARLES C. JEROME, of Chicago, in the county of Cook and State of Illinois, have invented certain new and useful Improvements in Metallic Packing for Piston-Rods; and I do hereby declare the following to be a full, clear, and exact description of the invention, such as will enable others skilled in the art to which it appertains to make and use the same.

My invention relates to an improvement in metallic piston-rod packings.

It has been found that in the pressure of steam in contact with packings, in cases where the cone expands toward the steam at any rate, there is a tendency to wedge the packing between the rod and the walls of the cone causing undue friction and wear.

The object of my present invention is to do away with all undue friction and uneven wear and pressure; and to this end it consists in arranging the stuffing-box and gland in such a manner and connecting the packing with the piston-rod in such a manner that steam is prevented from having any effect upon the packing.

The invention still further consists in certain novel features of construction and combinations of parts, as will be hereinafter fully described, and pointed out in the claims.

The accompanying drawing is a sectional view through the packing.

A represents one head of a horizontal steam-cylinder, and 1 is a piston-rod passing through the cylinder. The stuffing-box 2 is preferably integral with the head A of the cylinder, but may, of course, be otherwise secured. The outer end of this stuffing-box is flanged and provided with a flat seat 3. On this seat the gland 4 rests and is held to the flange by bolts 5, or other means of similar character. The gland is provided with a recess 6 on the part which rests in contact with the stuffing-box, in which a packing-gasket 7 is placed to form a steam-tight joint. The stuffing-box preferably has a cylindrical-shaped cavity 8 in its interior and the gland has a conical cavity 9. Contiguous to the stuffing-box an annular recess or joint 10 is ground out in the interior wall of the gland.

A cone 11, made to fit tightly around the piston-rod, rests with its closed end in the cavity 8, where it is held in line with the rod and prevented from bearing heavier at one point on the rod than at another by the action of the spiral springs 13, which are placed in holes 14 in the cone and impinge against the inner walls of the stuffing-box, thus causing even wear at all points and on all sides. At the opposite or open end the cone is flanged, and this flange 15 rests in the joint 10, where it is held steam-tight by the pressure on the opposite end of the cone and permitted to move laterally.

Only a portion of the cone fits tightly around the piston-rod, and the remainder is cut out preferably to form first a cylindrical and then a conical packing-cavity, in which several lap-rings 16, of suitable packing metal or other material, are inserted and held tightly by a spring-actuated follower 17. The object of this particular formation of packing-cavity is very evident, as it permits the rings to work down as they are worn off by frictional contact with the rod into the more restricted portion, where they are forced by the pressure of the spring 18 against the follower. Said spring is held in recess 19, formed by the overhanging flange 20 in the end of the gland.

So from the construction it is seen that steam-pressure is kept from the packing entirely, being all exerted on the closed end of the cone, and that the packing is made to automatically compensate for wear due to the frictional contact of the piston-rod therewith, and, further, that all the parts are automatically held in position to wear alike.

As the piston-rod is horizontal, it follows that the weight of the cone and the contained packing falls on the top side of the piston-rod. By supporting the cone on springs this weight is held off the rod, and hence the upper face of the rod and the adjacent face of the cone and inclosed packing are not subject to any more friction than the under side of the rod. The springs maintain the cone in the center of the box and prevent undue wear on the top of the rod.

It is evident that slight changes might be resorted to in the form and arrangement of the several parts described without departing from the spirit and scope of my invention, and hence I do not wish to limit myself to the particular construction herein set forth; but, Having fully described my invention, what I claim as new, and desire to secure by Letters Patent, is—

1. In a packing, the combination, with a stuffing-box, of a packing-cone, and elastic devices bearing on said packing-cone for preventing unequal pressure of the packing and cone upon the rod, substantially as set forth.

2. In a packing, the combination, with a stuffing-box and a rod, of a packing-cone, packing-rings therein, and elastic devices bearing on said packing-cone for preventing unequal pressure of the packing rings and cone upon the rod, substantially as set forth.

3. The combination, with a stuffing-box and a gland, of a packing-cone having one end in a steam-tight joint between the stuffing-box and gland, and elastic devices bearing on the packing-cone for preventing an unequal pressure at the opposite ends of the packing-cone, substantially as set forth.

4. The combination, with a stuffing-box and gland, of a packing-cone having a flange thereon projecting into a steam-joint at one end, and provided with springs for holding the cone in line with the rod and preventing an unequal pressure on the packing, substantially as set forth.

5. The combination, with a stuffing-box, a gland secured thereto and having an annular joint formed therein contiguous to the stuffing-box, a packing-cone having a flange extending into the joint, said cone having a packing-cavity therein, and springs for holding it in position in the box, of lap packing-rings, a follower, and spring bearing on said follower, substantially as set forth.

In testimony whereof I have signed this specification in the presence of two subscribing witnesses.

CHARLES C. JEROME.

Witnesses:
A. J. VAN PATTEN,
HENRY R. SMITH.